US012759938B2

(12) United States Patent
Frier et al.

(10) Patent No.: US 12,759,938 B2
(45) Date of Patent: Oct. 13, 2026

(54) CEMENTITIOUS COMPOSITION FOR PROTECTING SURFACES AGAINST (BIO)CORROSION

(71) Applicant: IMERTECH, Paris (FR)

(72) Inventors: Eric Frier, Brignais (FR); Jean Herisson, Lyons (FR); Muriel Chambon, Heyrieux (FR); Dominique Guinot, Chezeneuve (FR)

(73) Assignee: IMERTECH, Paris (FR)

( * ) Notice: Subject to any disclaimer, the term of this patent is extended or adjusted under 35 U.S.C. 154(b) by 611 days.

(21) Appl. No.: 17/788,246

(22) PCT Filed: Dec. 23, 2020

(86) PCT No.: PCT/EP2020/087776
§ 371 (c)(1),
(2) Date: Jun. 22, 2022

(87) PCT Pub. No.: WO2021/130319
PCT Pub. Date: Jul. 1, 2021

(65) Prior Publication Data

US 2023/0033751 A1 Feb. 2, 2023

(30) Foreign Application Priority Data

Dec. 23, 2019 (FR) ...................................... 1915492

(51) Int. Cl.

| | |
|---|---|
| ***C04B 28/06*** | (2006.01) |
| ***C04B 14/30*** | (2006.01) |
| *C04B 111/00* | (2006.01) |
| *C04B 111/23* | (2006.01) |

(52) U.S. Cl.
CPC .............. *C04B 28/06* (2013.01); *C04B 14/30* (2013.01); *C04B 2111/00163* (2013.01); *C04B 2111/00482* (2013.01); *C04B 2111/23* (2013.01)

(58) Field of Classification Search
CPC ..... C04B 14/30; C04B 14/303; C04B 20/008; C04B 2111/00163; C04B 2111/00482; C04B 2111/23; C04B 22/10; C04B 24/06; C04B 24/38; C04B 24/383; C04B 28/06; C04B 7/32; C09D 5/08; Y02W 30/91
See application file for complete search history.

(56) References Cited

U.S. PATENT DOCUMENTS

2004/0083926 A1* 5/2004 Mitkova .................. B22C 1/00 106/725
2012/0211391 A1 8/2012 Al-Mehthel et al.

FOREIGN PATENT DOCUMENTS

| | | |
|---|---|---|
| AU | 200213602 | 8/2002 |
| AU | 200213630 | 8/2002 |
| JP | 2003-261372 | 9/2003 |

OTHER PUBLICATIONS

JP 4558223, Jul. 30, 2010.*
Mouchot et al. AU 1363002 A (Year: 2002).*
(Continued)

*Primary Examiner* — Lawrence D Ferguson
(74) *Attorney, Agent, or Firm* — NIXON & VANDERHYE

(57) ABSTRACT

Disclosed is a novel cement and aggregate compositions, to uses thereof for protecting surfaces, in particular surfaces likely to be affected by biocorrosion.

26 Claims, 7 Drawing Sheets

(56) References Cited

OTHER PUBLICATIONS

Hammad A. Khan, et al., "Durability of calcium aluminate and sulphate resistant Portland cement based mortars in aggressive sewer environment and sulphuric acid", Cement and Concrete Research, vol. 124, Aug. 9, 2019, 28 pages.
Karen L. Scrivener, et al., "High-performance concretes from calcium aluminate cements", Cement and Concrete Research, vol. 29, No. 8, Jul. 5, 1998, pp. 1215-1223 (9 pages).
Anonymous, "Sewpercoat PG Product Data Sheet", Dec. 13, 2013, 3 pages.
Christopher Wöhrmeyer, et al., "Calcium Aluminate Aggregates for Use in Refractory Castables", Technical Paper Presented at Xxxxith Colloquium on Refractory, Sep. 1, 1998, 13 pages.
Search Report for FR Application No. 1915492 dated Aug. 25, 2020, 3 pages.
International Search Report for PCT/EP2020/087776 dated Apr. 19, 2021, 7 pages.
Written Opinion of the ISA for PCT/EP2020/087776 dated Apr. 19, 2021, 6 pages.

* cited by examiner

After 9 months

After 3 months

After 3 months

After 9 months

After 9 months
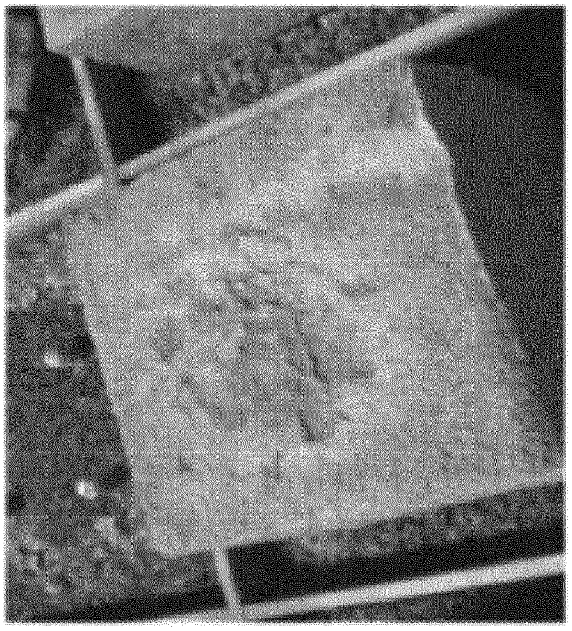
FIG.5
After 3 months
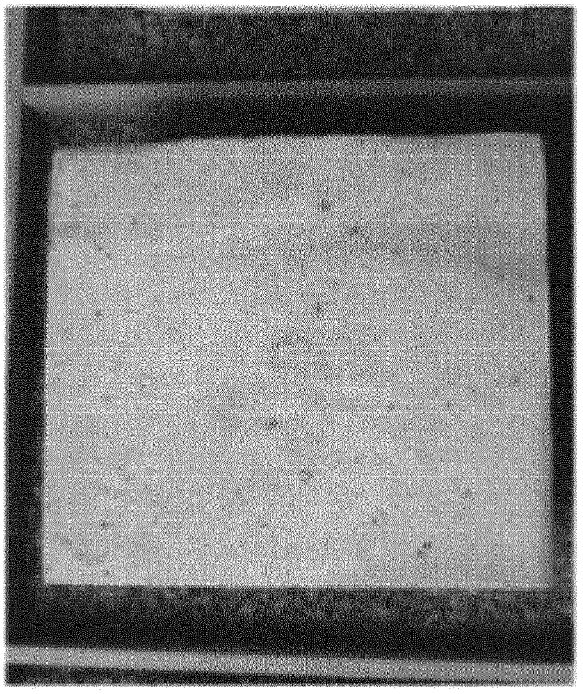

After 3 months

After 9 months

CEMENTITIOUS COMPOSITION FOR PROTECTING SURFACES AGAINST (BIO)CORROSION

CROSS-REFERENCE TO RELATED APPLICATIONS

This application is the U.S. national phase of International Application No. PCT/EP2020/087776 filed Dec. 23, 2020 which designated the U.S. and claims priority to French Patent Application No. 1915492 filed Dec. 23, 2019, the entire contents of each of which are hereby incorporated by reference.

BACKGROUND OF THE INVENTION

Field of the Invention

The present invention concerns the protection or rehabilitation of installations subjected to acid corrosion, in particular biogenic corrosion.

Description of the Related Art

Biogenic corrosion is due to bacteria living on unsubmerged, wet walls and which convert hydrogen sulfide ($H_2S$) in effluent to sulfuric acid which corrodes the concrete and metal of infrastructures. For example, numerous sewerage networks and plants are affected: in a sewerage network, the activity of these acidophilic bacteria is capable of corroding and destroying up to 20 mm of concrete per year. Biogenic/$H_2S$ corrosion can therefore be a serious problem for the lifetime of engineering structures, causing heavy expenditure for maintenance thereof.

The protection of infrastructures with acid-resistant materials (organic resins, polymers, plastic materials, glass fibre, etc) also proves to be costly and unsatisfactory insofar as these coatings do not prevent growth and proliferation of acidophilic bacteria with the result that the sulfuric acid which they produce infiltrates into the coating.

For rehabilitation, the underground use of polymer resins also raises the challenge of obtaining surfaces that are sufficiently dry to obtain good adhesion and entails safety problems related to the use of solvents in a confined medium.

JP 2003261372, AU 200213602 and AU 200213630 describe mortar compositions comprising cement and aggregate with high binder content (cement) in relation to aggregate. Nevertheless, the compositions described in these documents have the disadvantage of exhibiting surface defects (cracking, powdering . . . ) if curing is not conducted under good conditions.

SewperCoat® marketed by Imerys Aluminates proposes a protection or repair strategy based on a cement mortar and aggregate but again with high cement content. This formulation also has the specificity that it must be applied with a minimum thickness of 15 mm, which is far too thick for new structures having geometry defined to obtain specific hydraulicity.

Novel compositions therefore remain to be identified providing protection against acid corrosion such as biogenic corrosion, that are fine, have good adhesion on any surface condition including smooth surfaces, are resistant and stable and easy to apply.

SUMMARY OF THE INVENTION

A first object of the invention concerns a mortar composition for protecting surfaces against corrosion, said composition comprising:

a hydraulic binder of calcium aluminate type;
a calcium aluminate aggregate;
wherein the binder/aggregate ratio is lower than 0.13 (by weight).

The compositions of the invention advantageously have a so-called «bacteriostatic» effect which drastically slows development of the ecosystem of acidophilic bacteria, inhibiting production of acid at its very source.

Contrary to other inert materials such as epoxy, vinyl, PVC or HDPE, the compositions of the invention adhere not only to dry surfaces, but also adhere very well to wet surfaces and are not subject to bubbling or perforation.

By hydraulic binder, it is meant a binder which forms and sets by chemical reaction with water. Typically, as hydraulic binder suitable for the invention, mention can be made of alumina cements such as SECAR® cements, in particular SECAR®71 (marketed by Imerys aluminates).

By «aggregate» it is meant an assembly of particles included in the composition of mortars or concretes, such as gravel and sand, or synthetic aggregate. As synthetic aggregate, it is particularly meant aggregate derived from sintering or fusion processes, in particular by crushing or grinding calcium aluminate clinker. Typically, aggregates suitable for the invention have a particle size of less than 1 mm, typically of between 250 and 800 μm. For example, the aggregates of the invention may comprise at least 40% by weight of alumina relative to the weight of the aggregate.

In one embodiment, the term «corrosion» used herein particularly refers to corrosion induced by a microorganism such as a bacterium e.g. biogenic corrosion, and more particularly acid corrosion related to $H_2S$ in particular.

This issue is particularly described in the publication: Field investigations of high-performance calcium aluminate mortar for wastewater applications (S. Lamberet & All—Calcium Aluminate Cements: Proceedings of the Centenary Conference, Avignon—2008).

The composition of the invention has a binder/aggregate ratio lower than 0.13 (by weight). For example, the composition of the invention has a binder/aggregate ratio lower than or equal to 0.12 (by weight). For example, the composition of the invention has a binder/aggregate ratio lower than 0.10 (by weight). Alternatively, the composition has a binder/aggregate ratio lower than 0.09 (by weight), for example lower than 0.08 (by weight).

In one embodiment, the mortar composition of the invention may also comprise an alumina source soluble at pH 3 in water.

Soluble alumina is beneficial in the process of biodeterioration to combat the production of acid by microorganisms.

By «alumina source soluble at pH 3 in water», it is meant ingredients such as bauxite, bayerite, boehmite, diaspore, hydrargillite, nordstrandite, alumina gels, transition aluminas, or alumina hydrates such as the ingredients SH 30 and SH 500 (marketed by Altéo) for example, alone or in combination, in particular to improve particle size distribution of the composition.

In one embodiment, the total alumina content in the composition is between 35 and 70%, in particular between 45 and 65% by dry weight of the mortar composition.

The total alumina content is particularly based on the content provided by the hydraulic binder, aggregate and soluble alumina.

In one embodiment, the mortar composition of the invention may also comprise fines.

By «fines», it is meant elements of very small size (in general with mean diameter of less than 100 μm, particularly 50 μm), typically used either as filler to increase compactness of a concrete in particular, or as constituent of some hydraulic binders. As fines, particular mention can be made of limestone, fumed silica. As fumed silica, particular mention is made of RW-Fuller products (marketed by AMG Silicon), Elkem microsilica 920 (marketed by Elkem), Elkem Microsilica 940 (marketed by Elkem), Cofermin and MasterRoc MS610. Fines can be included up to an amount of 1 to 5%, typically 2-3% by weight of the mortar composition.

In one embodiment, the mortar composition may also comprise one or more additives. As additives, particular mention can be made of additives generally used to adjust setting properties, water retention and/or to improve the rheological properties of the formulation.

As additives, agents can be cited to reduce the quantity of water (such as REFPAC™ 500 marketed by Imerys aluminates); acid agents such as citric acid to maintain workability; agents allowing adjusting of setting kinetics such as lithium carbonate ($Li_2CO_3$); agents to improve viscosity such as guar ether, starch ether, cellulose ether.

Typically, the content of additives in the composition is between 0 and 5% by dry weight of the composition, preferably between 3 and 4% by dry weight.

In one embodiment, the mortar composition may also comprise one or more resins. By resin, it is meant all redispersible polymer powders adapted to the pH of cementitious materials. For example, particular mention can be made of Vinnapas 5044N resin or Vinnapas 8031 H resin by Wacker®, Axilat UP 600B or Axilat HP 8538 resin by Synthomer. The resin(s) can be included in an amount of between 0.5 and 7% by weight of the mortar composition, for example between 1 and 4% by weight, preferably 1.5 to 3.5% by weight of the mortar composition. The resins(s) particular allow good adhesion to be obtained of the mortar composition onto any surface condition.

In one embodiment, the mortar composition of the invention is in the form of a dry preparation having a particle size distribution of typically less than 800 μm.

The term «particle size distribution» (PSD) is used herein to define the statistical distribution of the sizes of the particles forming the aggregate or composition of the invention. Particle size distribution can be measured with commonly used methods by laser diffraction or screening in particular.

In one alternative embodiment, the composition can be in wet form. In this case, it typically comprises between 10 and 20% (by weight) of water.

In one embodiment, the composition has a workability time of between 30 minutes and two hours, typically of about one hour.

In general, the setting time thereof is between 1 h and 3 h, typically about 2 hours, and the hardening time is generally between 4 and 6 hours.

A further object of the invention concerns a protective layer for a corroded surface or likely to be corroded, said layer comprising the mortar composition of the invention applied to all or part of said surface.

The term «corroded» herein particularly refers to biogenic acid corrosion, particularly corrosion by $H_2S$.

The «protective layer» of the invention designates a surface layer to modify the properties of the surface on which it is deposited. In particular, the purpose of the protective layer is to protect the surface against corrosion such as biogenic corrosion in particular.

Typically, said layer has a thickness of between 2 and 10 mm, preferably between 2 and 4 mm.

In one embodiment, the surface can have different surface conditions, from a smooth condition to a rough condition.

The terms «smooth condition» and «rough condition» refer to the absence or presence of irregularities and roughness as determined by visual or touch assessment, and to the quantity and type thereof. These surface conditions are particularly defined by CSP1-CSP9 surface profiles such as defined in ICRI Technical Guidelines (International Concrete Research Institute) «Selecting and Specifying Concrete Surface Preparation for Sealers, Coatings, and Polymer Overlays», Guideline 0310.2 (corresponding to Guideline 03732 of 1997, re-approved in 2002).

In one advantageous embodiment, the layer of the invention adheres to any surface condition of concrete, for example a smooth concrete surface.

A further object of the invention concerns a method for preparing a protective layer for a corroded surface or likely to be corroded such as afore-defined, said method comprising the steps of:

Applying said mortar composition of the invention to all or part of said surface, and hardening said layer thus obtained.

As surface, particular reference is made to structural surfaces of sewerage networks built in concrete.

In general, the application of the mortar composition onto the surface to be protected can be performed by any means, such as brushed or sprayed application. More preferably, application is by spraying.

A further object of the invention concerns a sewerage plant comprising a protective layer such as afore-defined on all or part of one or more corroded surfaces or likely to be corroded.

The present objects and embodiments are also envisaged:

1. A mortar composition for protecting surfaces against corrosion, said composition comprising:
   a hydraulic binder of calcium aluminate type;
   an aggregate of calcium aluminates;
   wherein the binder/aggregate ratio is lower than 0.1 (by weight).
2. The mortar composition according to object 1, also comprising an alumina source soluble at pH 3 in water.
3. The mortar composition according to any of the preceding objects, having a total alumina content of between 35 and 70% by dry weight of the mortar composition.
4. The mortar composition according to any of the preceding objects, such that it contains fines.
5. The mortar composition according to any of the preceding objects, such that it comprises one or more additives.
6. The mortar composition according to any of the preceding objects, such that the composition is in the form of a dry preparation having a particle size distribution of less than 800 μm.
7. The composition according to any of the preceding objects, also comprising 10 to 20% (by weight) of water.
8. A protective layer for a corroded surface or likely to be corroded, said layer comprising the mortar composition according to one of objects 1 to 7 applied to all or part of said surface.
9. The layer according to object 8, such that the thickness of said layer is between 2 and 10 mm.
10. The layer according to object 8, such that the surface is a smooth surface or rough surface.

11. The layer according to object 8, such that the layer adheres to any concrete surface condition, for example a smooth concrete surface.
12. The layer according to any of objects 8 to 11, such that the surface is corroded or likely to be corroded by $H_2S$.
13. A method for preparing a protective layer for a surface likely to be corroded according to any of objects 8 to 11, comprising:
    applying said mortar composition according to any of the objects identified above to all or part of said surface, and
    hardening the surface thus obtained.
14. The method according to object 13, such that application is performed by spraying.
15. A sewerage plant comprising a protective layer according to any of objects 8 to 11 on all or part of one or more corroded surfaces or likely to be corroded.

BRIEF DESCRIPTION OF THE DRAWINGS

FIG. 5 illustrates visual observation of Block C (Concrete A protected by composition 41B-F).

DESCRIPTION OF THE PREFERRED EMBODIMENTS

Examples

Figure 1:
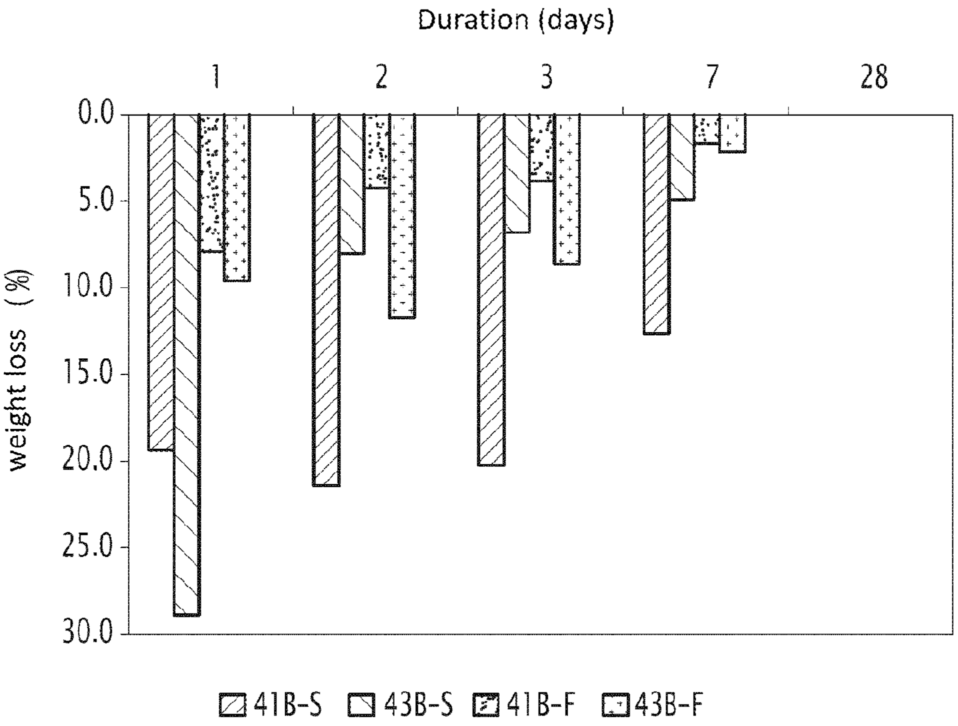
FIG. 1 illustrates the abrasion resistance of the composition of the invention.

Raw Materials Used:

- Secar® 71: Hydraulic binder marketed by Imerys aluminates.
- G1: synthetic aggregate obtained by grinding calcium aluminate clinker derived from a fusion process. It has a particle size of between 250 and 800 μm.
- G2: synthetic aggregate obtained by grinding calcium aluminate clinker derived from a sintering process. It has a particle size of between 250 and 800 μm.
- Limestone filler: allows acid neutralization and an increase in the particle load of fines, and hence control over reactivity of the binder. Preferably, the limestone filler/CAC ratio is about 1.
- Aluminas soluble at pH 3 in water, derived from bauxite, bayerite, boehmite, diaspore, hydrargillite, nordstrandite, alumina gels, transition aluminas, or alumina hydrates. Fumed silicas: such as Cofermin and MasterRoc MS 610, RW-Fuller (marketed by AMG Silicon), Elkem Microsilica 920 (marketed by Elkem), Elkem Microsilica 940 (marketed by Elkem) to limit bleeding, generally used in an amount up to 2-3%.
- REFPAC 500 (marketed by Imerys aluminate): Fumed silica dispersing agent also providing a water-reducing effect.
- Citric acid; allows workability of longer than 30 minutes to be maintained when temperature increases to 20/25° C. If needed, an additive can be added to maintain workability.
- Setting accelerator such as $Li_2CO_3$: allows initiation of kinetics between 5 and 20° C.
- Texturizing agent such as starch, cellulose ether, guar ether (Escal HS 16F marketed by Lamberti, or Esacol HS 20): used to improve texture and tackiness of the solution on application.
- Resin such as afore-defined to improve adhesion of the composition.

Aggregates G1 and G2 have the Following Chemical Composition:

TABLE 1

| | G1 | G2 |
|---|---|---|
| $Al_2O_3$ (wt. %) | 33.5-43.5 | 58.0-66.0 |
| CaO (wt. %) | 35.0-40.0 | 23.0-28.0 |
| $Fe_2O_3$ (wt. %) | 14.0-18.0 | 2.0-3.0 |
| $SiO_2$ (wt. %) | 3.0-5.0 | 5.0-6.0 |
| MgO (wt. %) | — | 0.5-1.0 |
| $TiO_2$ (wt. %) | — | 3.0-4.0 |

Percentages are weight % relative to total aggregate weight

Operating Modes:

Particle Size Distribution

Measurements of particle size distribution were carried out in particular for particle sizes of less than 100 microns via laser diffraction on Malvern Mastersizer 3000 optical system equipped with Aero S a dry power disperser with measuring range of between 0.1 and 1500 μm.

For larger particle sizes (larger than 100 microns), and in particular for the aggregates, particle size was measured by screening, for example using a square-mesh sieve in stainless steel cloth meeting standard ISO 3310. Typically, the sieve apertures can be selected from among the following ranges: 125, 160, 250, 400, 800, 1000. Said sieves are commercially available and marketed for example by Prolabo, Tripette & Renaud, Retsch.

Accuracy is to within 5% and results are expressed in volume percentage relative to equivalent spherical diameter.

RAJA Measuring Equipment

RAJA measuring equipment was used to measure variations in size during the setting phase (plastic phase). The test specimens were prisms 50 cm in length for thickness of 2.5 cm and width of 9.5 cm. Measurements were conducted on the basis of lasers pointed onto specific mobile Teflon wedges affixed to each end of the specimen. The specimens were measured for 24 hours at 23° C., 50% relative humidity. The anchor points of the tested product on these wedges were released while continuing measurement of the specimen after the setting time with conventional size variation measurements.

Cracking Test Under Restrained Shrinkage

ASTM C 1581 standard (Standard test method to determine age at cracking and induced tensile stress characteristics of mortar and concrete under restrained shrinkage) describes how to measure restrained or controlled shrinkage.

I-Shaped Mould

Cracking potential can be observed with an I-shaped mould such that the two parallel bars are rough while the median bar is smooth. Therefore, the cementitious material is retained by the two rough portions and, if cracks occur, they will occur in the median portion due to tensile stress at the two ends. Daily monitoring of the specimens was carried out for 28 days and up until the onset of cracks.

Mechanical Properties

The mechanical properties of the different mixtures were measured by compression using a press made by 3R of RP 300-10 ELC type, and three-point bending using a 3R press of RP 50-SYNTRIS type. The load increase for the 3R press of RP 300-10 ELC type was 2400 N/s±200 N/s and for the 3R press of RP 50-SYNTRIS type it was 50 N/s±10 N/s. Accuracy was ±15%. Prisms of 2×2×16 $cm^3$ were released from the moulds after 6 hours. Measurements were taken after 1, 2, 3, 7 and 28 days on the specimens stored either at 23° C. and 50% relative humidity or under water (container stored at 23° C.).

Adhesion Test Via Tensile Pull-Off

The mortar was applied to concrete slabs (marketed by Antoniazzi) using a Sablon roughcast applicator until a thickness of 10 mm was obtained. Once the material had set, the surface was lightly sanded to facilitate adhesion of square test studs of size 50×50 mm bonded using an epoxy resin (Uratep, PAREX LANKO). These were pulled off after 24 hours, 7 and 28 days using an extractor (23° C., 50% RH). For determination of underwater adhesion, the concrete slabs coated with the tested coatings were kept 7 days at 23° C. and 50% RH and then immersed until the time of measurements in water at 23° C. The pull-off tests were performed at 7 days and 21 days.

Abrasion Resistance

Abrasion resistance was defined using a Taber circular abrasion tester equipped with H22 grinding wheels (500 g additional weight) with the following procedure: 2 kg of mortar of each specimen were first mixed in a Perrier mixer and then moulded in two lubricated Taber Teflon moulds to a thickness of 3 mm. After 24 hours, the specimens were released from the moulds and stored at 23° C.±2° C. and 50±5% relative humidity for the defined measurement times (1, 2, 3, 7 and 28 days). Weights were measured after 50, 100, 150, 200 and 500 rotations. Before each measurement, dust was removed from the surfaces of the specimens and grinding stones. The measurement range was between 0 and 20 g. Accuracy of about 10

Results

The impact of modification of type of aggregate on shrinkage measured with RAJA equipment and mixtures having low cement content were tested:

TABLE 2

| Aggregate | G1 | | G2 | |
|---|---|---|---|---|
| Secar ® 71 (%) | 5 | 10 | 5 | 10 |
| Shrinkage (in μm/m) | 850 | 1250 | 350 | 550 |

Percentages are weight % relative total weight of the mixture.

A synergy exists between type of aggregate and the cement used.

Two types of additive mixtures were investigated.

The Basic Mixture was:

TABLE 3

| | |
|---|---|
| REFPAC 500 | 1% |
| Citric acid | 0.005% |
| Lithium carbonate | 0.0012% |

Percentages are weight % relative total weight of the mixture.

The first mixture was developed from a mixture based on kinetics: $T_{off}$ and $T_{max}$ of less than 2 hours 30 and workability of between 30 and 60 minutes. This mixture contained citric acid, lithium carbonate, cellulose and a resin:

TABLE 4

| | |
|---|---|
| REFPAC 500 | 1% |
| Citric acid | 0.005% |
| Lithium carbonate | 0.0012% |
| Redispersible polymer powder | 2% |
| Guar ether | 0.015% |

Percentages are weight % relative total weight of the mixture.

The second mixture led to workability of about 60 minutes and $T_{off}$ less than 2 hours 30 and $T_{max}$ of about 3 hours. This second mixture contained REFPAC 500, citric acid, lithium carbonate and cellulose. It was chosen for subsequent developments based on low water demand.

Mortar Spraying Test

Four mixtures were chosen to be sprayed using a Sablon roughcast applicator. The tested mixtures are given below:

TABLE 5

| | 41B-S | 43B-S | 41B-F | 43B-F |
|---|---|---|---|---|
| G1 | 65 | 75 | | |
| G2 | | | 65 | 75 |
| Soluble alumina | 20 | 5 | 20 | 5 |
| Secar ® 71 | 5 | 9 | 5 | 9 |
| Limestone filler (d50 = 2 μm) | 5 | 5 | 5 | 5 |
| Fumed silica | 1 | 1 | 1 | 1 |
| Metakaolin (d50 = 6 μm) | 5 | 5 | 5 | 5 |
| Total | 101 | 100 | 101 | 100 |
| Water | 16 | 16 | 14 | 15 |
| Total $Al_2O_3$ content (weight % relative to total weight of mixture) | 54.5 | 55.8 | 42.5 | 40.4 |

In this Table, the heading in each column refers to type of aggregate: S for G2 and F for G1.

Spraying of the four mixtures with the Sablon roughcast applicator to a thickness of about 3 to 5 mm was easy to carry out. In a thin layer, these products showed scarce slipping. Guar ether provided tackiness. The appearance of the coatings was particularly smooth and less grainy for those mixtures containing the most fines (mixtures 41B-S and 41B-F). No cracking was observed after one week.

The properties were characterized for these four mixtures at 23° C. and 50% relative humidity:

rheology;

mechanical properties;

RAJA;

cracking after spraying;

cracking as per standard C 1581;

cracking in I-shaped moulds.

The results are summarized below:

TABLE 6

| | | 41B-S | 43B-S | 41B-F | | 43B-F |
|---|---|---|---|---|---|---|
| Water (weight % relative to total weight of the formula) | | 16 | 16 | 15 | 14 | 14 |
| Slump | $T_0$ (mm) | 220 | 210 | 230 | 185 | 235 |
| 25 tamps | $T_{30}$ (mm) | | | | 170 | 225 |
| | $T_{60}$ (mm) | | | | 165 | 197 |

TABLE 6-continued

| | 41B-S | 43B-S | 41B-F | 43B-F |
|---|---|---|---|---|
| $T_{off}$ (h) | 2 | 3 | 2.5 | |
| $T_{max}$ (h) | 3 | 5 | 6 | 6 |
| Raja (μm/m) | 300-350 | 450 | 1650 (?) | 900 |
| Sablon applicator | Yes | Yes | Yes | Yes |
| Cracking after spraying | No | No | No | No |
| Cracking in I-shaped mould | No | No | No | No |
| Cracking as per standard C1581 | No | n.d. | n.d. | No |
| Mechanical compression at 7 days (MPa) | 3 | 10 | 45 | 42 |

Abrasion Resiance

Abrasion resistance of the 4 mixtures tested on a Taber abrasion tester is illustrated in FIG. 1.

Compositions 41B-F and 43B-F are particularly resistant to abrasion

Impact of Surface Preparation

Full-scale (worksite type) wet process spraying tests were conducted with composition 41B-F of the invention on L-shaped walls in tamped concrete i.e. very smooth. The surfaces were prepared in different manners to obtain surface conditions of different roughness:

Surface 1«as struck», e.g. smooth;

Surface 2«as struck», and coated with an adhesion primer;

Surface 3«as struck», scoured and dried;

Surface 4: «as struck», scoured and left wet;

Surface 5: «as struck», and cleaned with water;

Surface 6: «as struck», and sanded to reach roughness 1 (CSP 1),

Surface 7: «as struck», and sanded to reach roughness 2 (CSP 2),

Surface 8: «as struck», and sanded to reach roughness 3 (CSP 3).

By CSP 1, CSP 2, CSP 3 it is meant surfaces such as described in the ICRI Technical Guidelines (International Concrete Research Institute «Selecting and Specifying Concrete Surface Preparation for Sealers, Coatings, and Polymer Overlays», Guideline 0310.2 (corresponding to Guideline 03732 of 1997, re-approved in 2002)).

Adhesion was measured in accordance with standard NF EN 1542.

Figure 2:
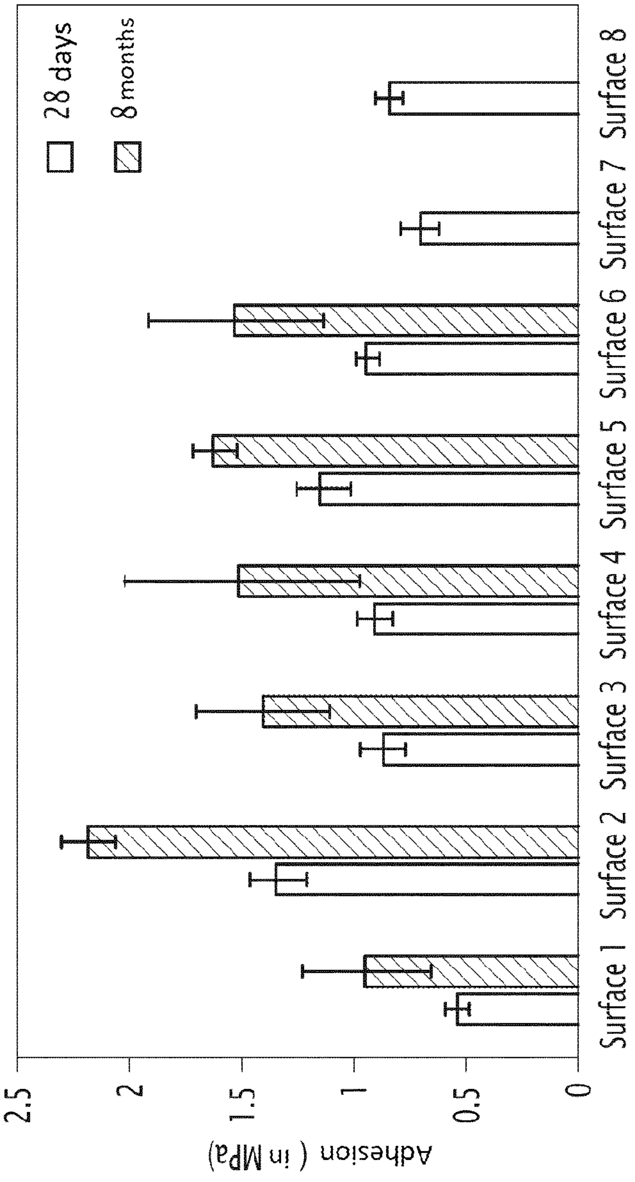
FIG. 2 illustrates adhesion results at 8 days and 28 days for composition 41B-F of the invention on CSP1 roughness test surfaces.
Figure 3:
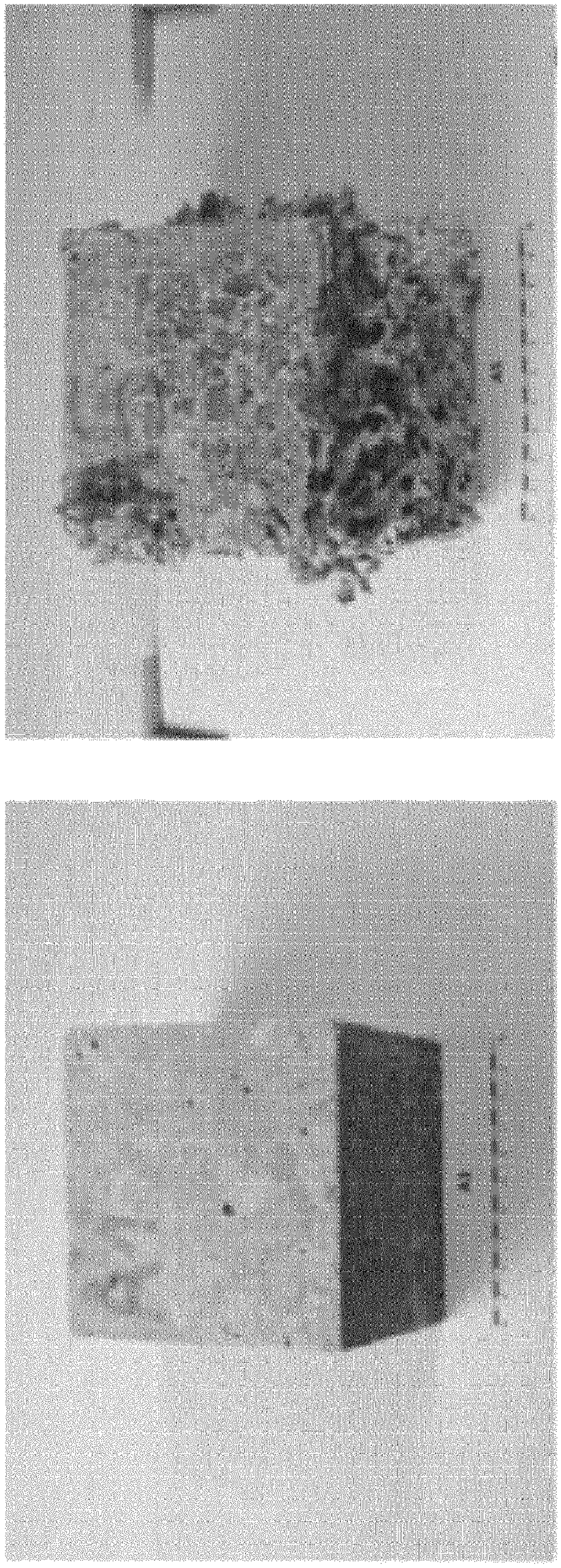
FIG. 3 illustrates visual observation of Block A (Concrete A protected by Cement CEM 1) after 3 and 9 months.

The adhesion values obtained after 28 days and 8 months are grouped together in FIG. 2.

These results show that:

the compositions of the invention are capable of adhering both to rough surfaces (surfaces 6 to 8) and to smooth substates (surfaces 1 to 5).

The compositions exhibit adhesion of at least 0.5 MPa.

An increase in level of adhesion is observed as a function of time.

Resistance to Biogenic Acid Corrosion

Two mixtures (41B-S and 41B-F) of the invention were applied to 15×15×15 cm blocks of concrete containing binder OPC CEM-1 and siliceous aggregate to a thickness of 3 mm (respectively block B and block C).

A third identical block (block A) was not coated with a layer of the invention.

A fourth 15×15×15 cm block of concrete was prepared containing binder with 65% blast furnace slag (GGBFS) plus 15% fumed silica and siliceous aggregate (block E). This type of binder containing blast furnace slag is reputed to be more resistant than CEM-1 to biogenic corrosion.

These four blocks were placed in a Fraunhofer chamber for accelerated testing of biogenic corrosion by $H_2S$ on these blocks.

Before the start of corrosion, these blocks were specifically prepared to lower the surface pH thereof via carbonatation, for the purpose of allowing the development of bacteria that are the source of biogenic corrosion.

The details of this process and the operating of the Fraunhofer corrosion chamber are described in detail in the publication by Wack, H. et al., Accelerated testing of materials under the influence of biogenic sulphuric acid corrosion (BSA), Microorganisms-Cementitious Materials Interactions, 25-26 Jun. 2018, Toulouse, 23-32.

These tests were conducted with a concentration of 100 ppm $H_2S$ in the chamber and 100% relative humidity.

Figure 4:
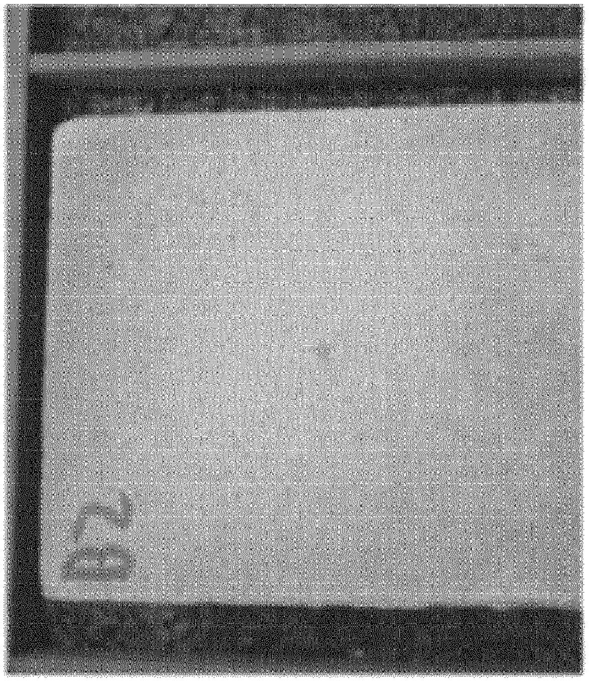
FIG. 4 illustrates visual observation of Block B (Concrete A protected by composition 41B-S).
Figure 4:
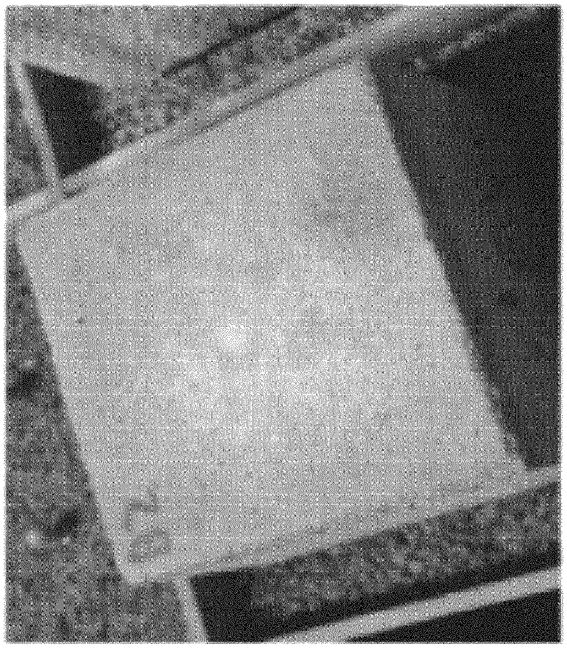
Figure 6:
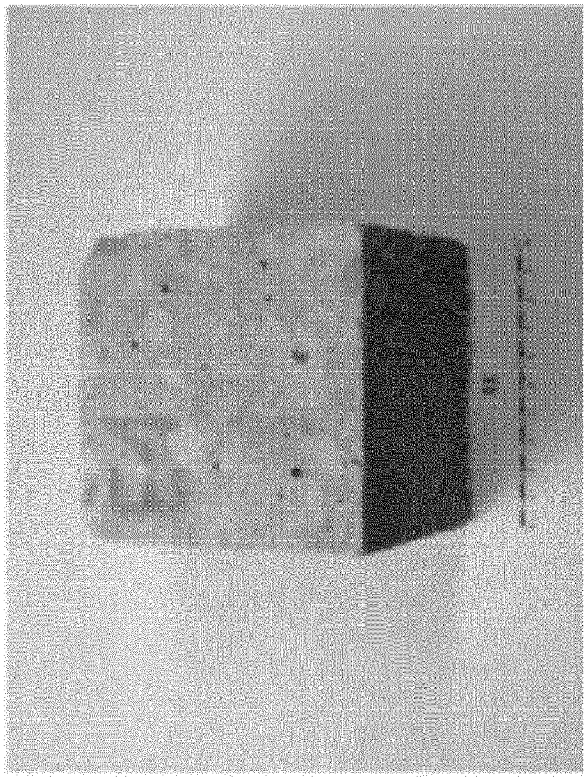
FIG. 6 illustrates visual observation of Block E (Concrete E protected by cement 65% GGBFS+15% fumed silica).
Figure 6:
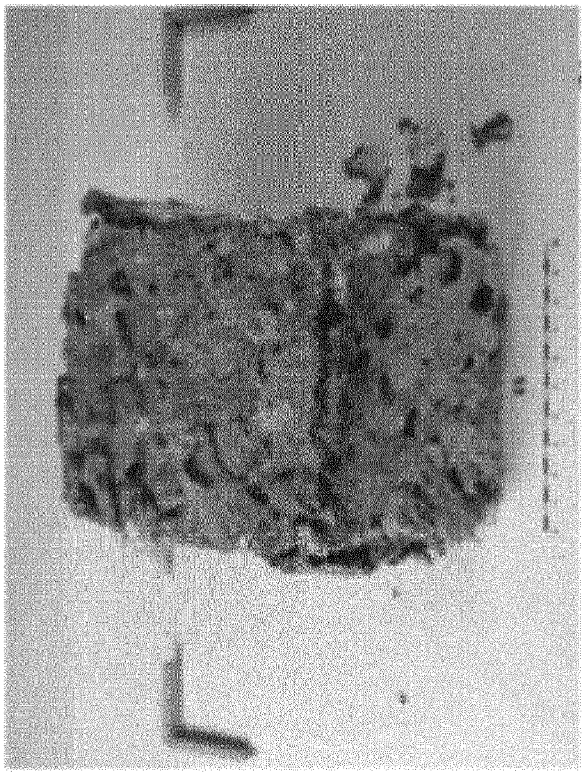

The surface pH values were regularly measured on the four blocks. Visual observation of these blocks was carried out over a period of 9 months. The visual observations of these blocks at the end of time periods of 3 months (104 days) and 9 months (301 days) are given in FIG. 3 to FIG. 6. It follows from FIGS. 4 and 5 that the blocks still remain in good condition after 9 months.

Figure 7:
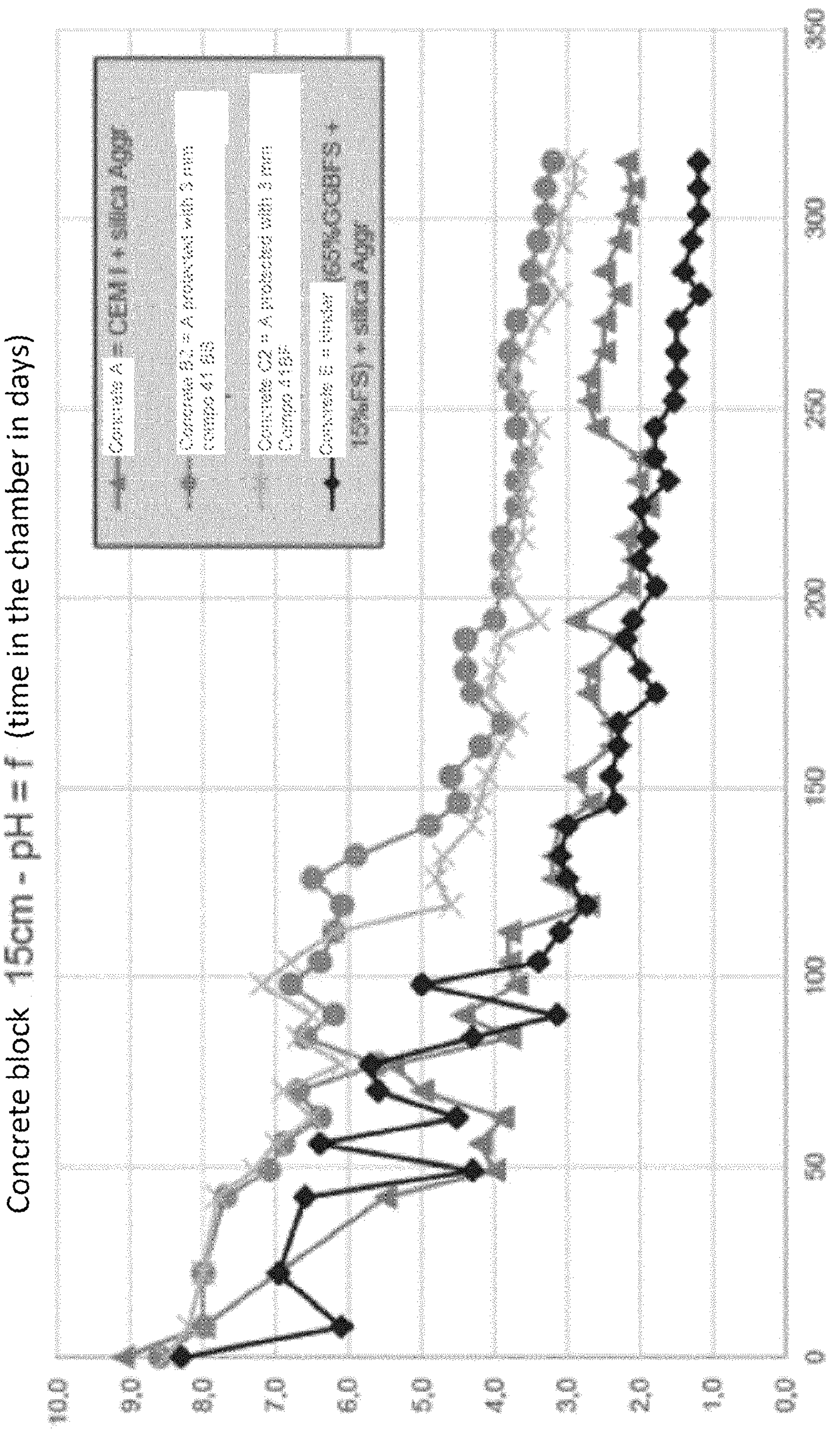
FIG. 7 illustrates changes in surface pH of the tested compositions as a function of time.

The changes in surface pH values over more than 9 months in the corrosion chamber are given in FIG. 7.

As shown in Table 7 and FIG. 7, it is ascertained that the condition of blocks A and E after 9 months is highly deteriorated.

Conversely, blocks B and C coated with mixtures 41B-S and 41B-F remain in very good condition even after 9 months in the Fraunhofer chamber.

The pH of blocks B and C remains stable at pH values higher than 3, whilst the pH of blocks A and E has dropped to as low as pH=2, even pH=1.2.

TABLE 7

| | Surface pH after t = XX days in the chamber | | | |
|---|---|---|---|---|
| | t = 0 | t = 104 days | t = 203 days | t = 301 days |
| Block A | 9.1 | 3.8 | 2.2 | 2.2 |
| Block B = Concrete A protected with compo 41BS | 8.6 | 6.4 | 3.9 | 3.3 |
| Block C = Concrete A protected with compo 41BF | 8.5 | 6.8 | 3.8 | 3.1 |
| Block E | 8.3 | 3.4 | 1.8 | 1.2 |

The invention claimed is:

1. A mortar composition for protecting surfaces against corrosion, said composition comprising:

a hydraulic binder of calcium aluminate type;

a calcium aluminate aggregate;

wherein the binder/aggregate ratio is lower than 0.13 (by weight); and wherein said composition further comprises one or more redispersible polymer powders.

2. The mortar composition according to claim 1, wherein said redispersible polymer powders are present in an amount of between 0.5 and 7% by weight of the mortar composition.

3. The mortar composition according to claim 1, wherein said redispersible polymer powders are present in an amount of between 1 and 4% by weight of the mortar composition.

4. The mortar composition according to claim 1, wherein said redispersible polymer powders are present in an amount of between 1.5 and 3.5% by weight of the mortar composition.

5. The mortar composition according to claim 1, wherein the binder/aggregate ratio is lower than 0.10 (by weight).

6. The mortar composition according to claim 1, wherein the mortar composition comprises a filler comprising fines.

7. The mortar composition according to claim 6, wherein the fines are in an amount of 1 to 5%, typically 2-3% by weight of the mortar composition.

8. The mortar composition according to claim 1, further comprising a source of alumina soluble at pH 3 in water.

9. The mortar composition according to claim 1 having a total alumina content of between 35 and 70% by dry weight of the mortar composition.

10. The mortar composition according to claim 1, wherein the mortar composition comprises fines.

11. The mortar composition according to claim 1, wherein the mortar composition comprises one or more additives.

12. The mortar composition according to claim 1, wherein the composition is in the form of a dry preparation having a particle size distribution of less than 800 μm.

13. The mortar composition according to claim 1, further comprising 10 to 20% water (by weight).

14. A protective layer for a corroded surface or a surface likely to be corroded, said layer comprising the mortar composition according to claim 1 applied to all or part of said surface.

15. The layer according to claim 14, wherein the thickness of said layer is between 2 and 10 mm.

16. The layer according to claim 14, wherein the surface is a smooth surface or a rough surface.

17. The layer according to claim 14, wherein the layer adheres to any concrete surface condition.

18. The layer according to claim 14, wherein the surface is corroded or likely to be corroded by $H_2S$.

19. A method for preparing a protective layer for a surface likely to be corroded according to claim 14, comprising:

applying said mortar composition to all or part of said surface, and hardening said layer thus obtained.

20. The method according to claim 19, wherein application is performed by spraying.

21. A sewage plant comprising a protective layer according to claim 14 on all or part of one or more surfaces that are corroded or likely to be corroded.

22. The mortar composition according to claim 8 having a total alumina content of between 35 and 70% by dry weight of the mortar composition.

23. The mortar composition according to claim 8, wherein the mortar composition comprises fines.

24. The mortar composition according to claim 9, wherein the mortar composition comprises fines.

25. The mortar composition according to claim 8, wherein the mortar composition comprises one or more additives.

26. The mortar composition according to claim 9, wherein the mortar composition comprises one or more additives.

* * * * *